Patented Apr. 14, 1942

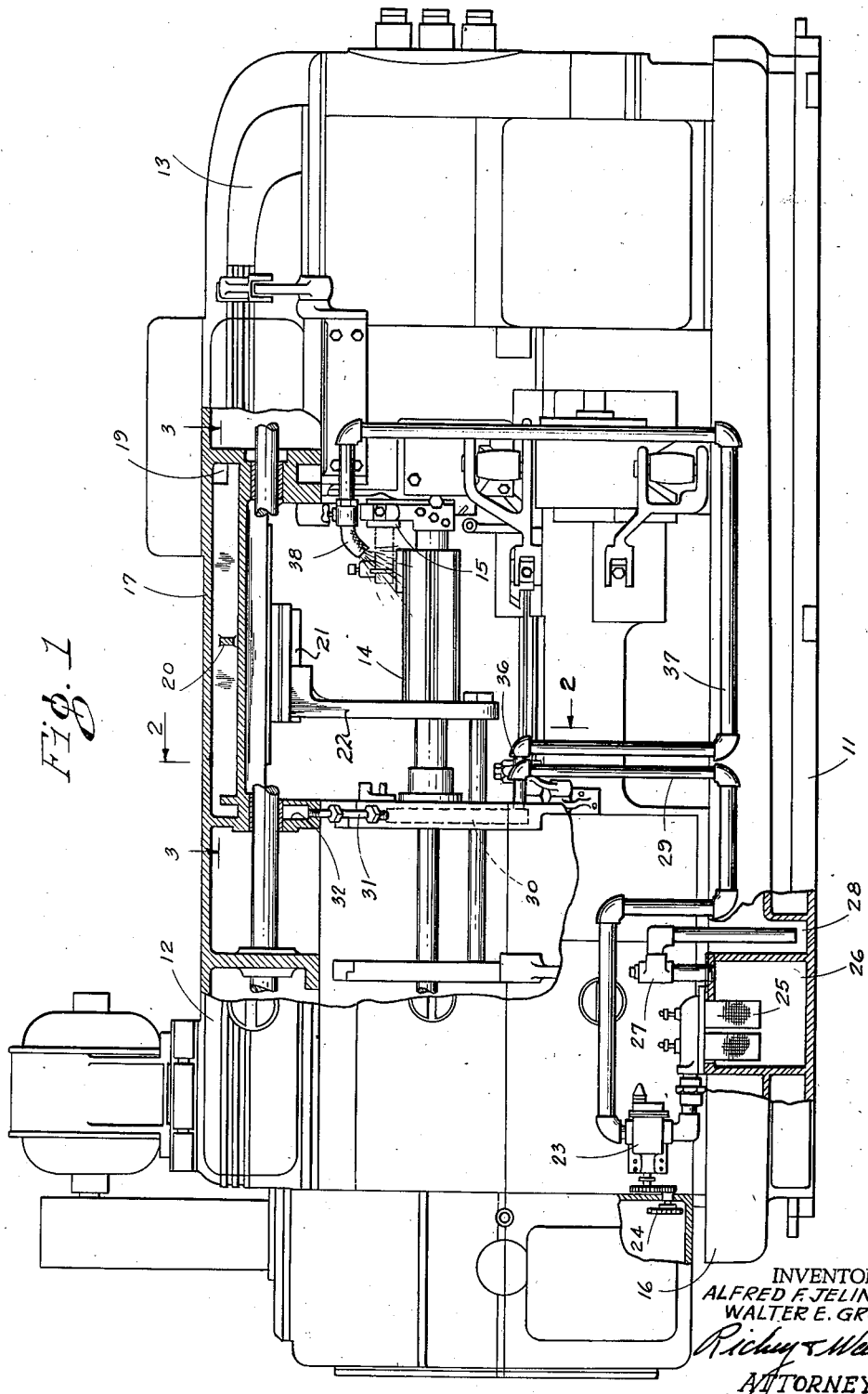

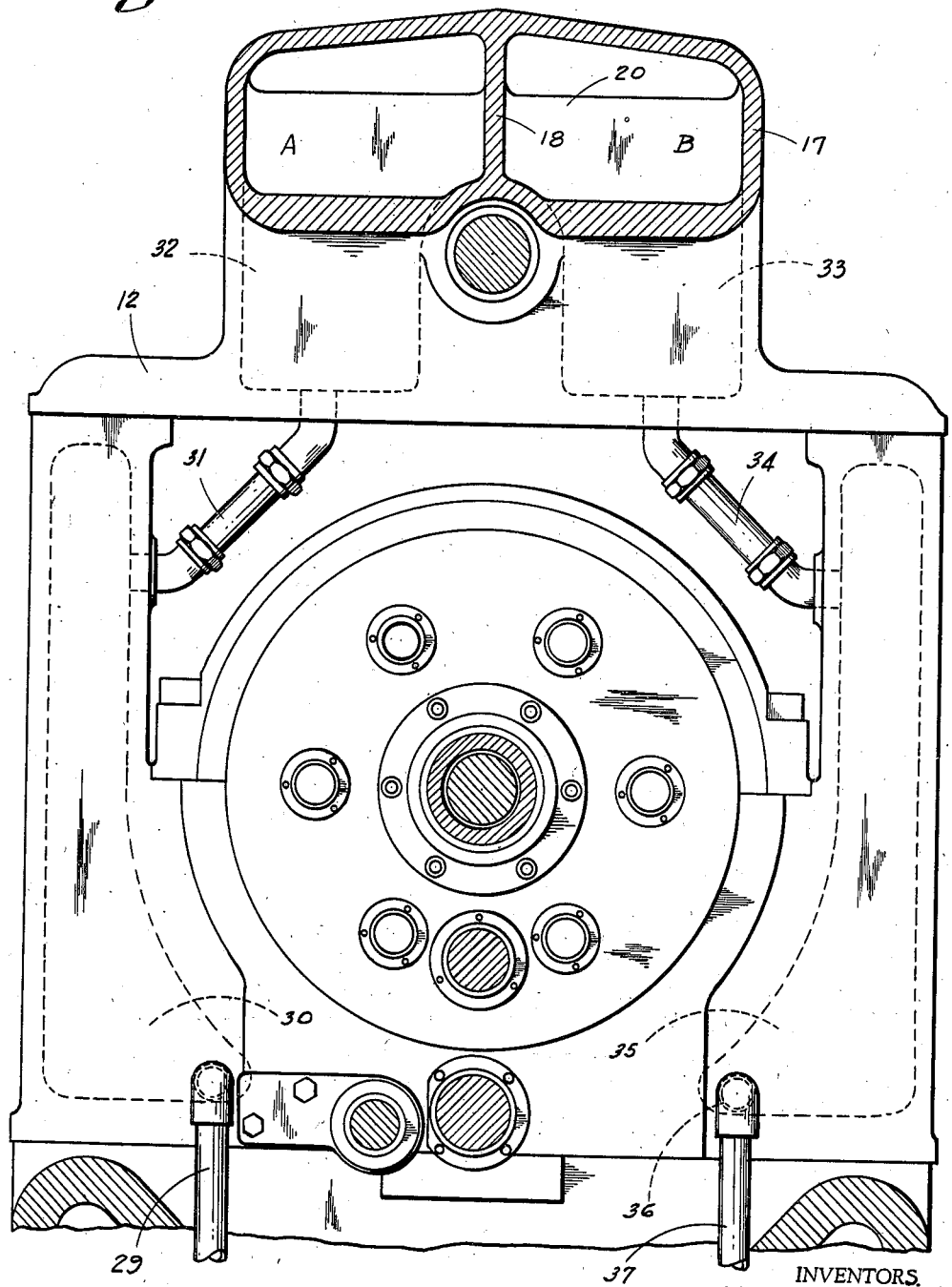

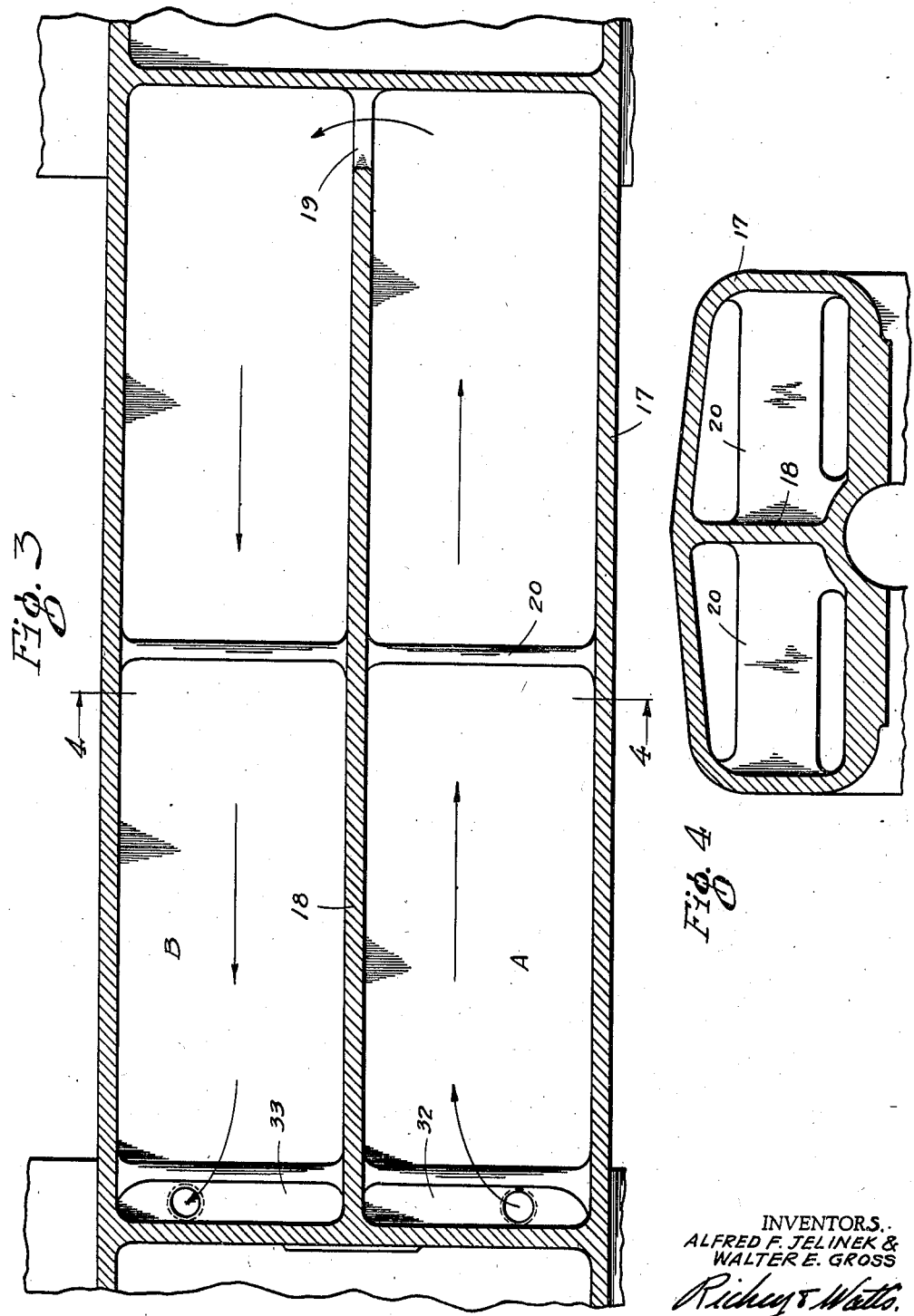

2,279,569

UNITED STATES PATENT OFFICE 2,279,569

HEAT EXCHANGER FOR MACHINE TOOLS

Alfred F. Jelinek and Walter E. Gross, Cleveland, Ohio, assignors to The Cleveland Automatic Machine Company, Cleveland, Ohio, a corporation of Ohio Application July 20, 1940, Serial No. 346,599

4 Claims. (Cl. 29—37)

This invention relates broadly to automatic screw machines and pertains more specifically to instrumentalities to effect the stabilization of the temperature within certain component parts of the machine in order to control the relative expansion and contraction thereof.

In machine tools of the type in which the cutting tools are disposed for operation in coaxial alignment with the work, it is essential that the head stock, the tool carrier and the tool slide housing be maintained at substantially even temperatures so that expansion and contraction of the two portions of the machine will be uniform. Thus in automatic screw machines where the cutting tools and their appurtenances are subjected to the heat generated by the frictional resistance of the cutters with the work it is necessary to cool the tools and the head stock or work holding spindle mechanism and at the same time raise the temperature of the tool slide and tool slide housing in order to maintain the precision of the machine.

One of the objects of the invention is to provide a fluid circulatory system for machine tools which is adapted to facilitate dissipation of the heat from the zone in which the heat is localized and by means of such circulatory system raise the temperature in some other part of the machine.

Another object of the invention is to construct such of the castings of a machine tool as are subjected to radical variations in temperature with passages for the circulation of a thermal normalizing fluid therethrough.

Another object of the invention is to provide a heat exchange unit in a screw machine which employs as the thermal medium the cutting compound circulated over the tools.

Other objects and advantages more or less ancillary to the foregoing and the manner in which all the various objects are realized will appear in the following description, which considered in connection with the accompanying drawings, sets forth the preferred embodiment of the invention.

Referring to the drawings:

Fig. 1 is a rear elevational view of an automatic multiple spindle screw machine having the heat exchange mechanism embodied therein, certain portions of the machine being broken away and shown in section;

Fig. 2 is a transverse sectional view taken on a plane indicated by the line 2—2 in Fig. 1; and Fig. 3 is a horizontal sectional view through a portion of the beam connecting the spindle and tool slide housings, the section being taken on the plane indicated by the line 3—3 in Fig. 1.

Fig. 4 is a transverse sectional view of the beam, the section being taken on the plane indicated by the line 4—4 in Fig. 3.

Referring first to Fig. 1, the multi-spindle screw machine chosen herein for purposes of illustration embodies a bed 11 having a housing 12 mounted thereon, which encloses a tool slide and actuating mechanisms therefor. The work holding spindles are encased in a housing 13 disposed in the opposed end of the machine, the driving index and stock feed operating mechanisms being actuated through a rotatively driven shaft extending the length of the machine and coupled with the tool slide gearing.

The machine is preferably driven by an electric motor mounted upon the tool housing 12 and having secured to the outer end of the armature shaft a driving connection for imparting rotative movement to the main drive shaft of the machine. The tool slide 14 is formed for the reception of a plurality of tools disposed in radial relation thereon and organized for simultaneous operation upon the work pieces carried in the rotatively driven work holding spindle carrier. The spindle housing 13 is constructed for the support of the indexed and rotatively driven spindles and work holding chucks 15 connected thereto, the tool slide 14 being disposed in aligned relation with the collets or chucks 15. A pan 16 is mounted upon the base of the machine for the reception of the chips and stock waste removed from the work pieces during the machining thereof and further to receive the cutting compound which cascades upon the work and tools during the operation of the machine.

The tool slide and spindle housings are united by a beam 17 of tubular form which is constructed with a vertical longitudinally disposed wall dividing the beam into two separate chambers, A and B, the chambers being interconnected adjacent the housing 13 by an opening 19. Intermediate the ends there is a web 20 uniting the dividing wall 18 with the sides of the beam and forming baffles within the respective chambers. The web is disposed in spaced relation with the top and bottom walls of the beam, thus defining openings for the circulation of the fluid throughout the length of the chamber. The beam is formed with ways 21 in the lower face thereof for the support of a guide plate 22 connected with the tool slide 14.

In the base of the machine there is a pump 23 driven by a sprocket 24 through gearing (not shown) connected to the main drive shaft of the machine.

A pump is coupled with a filter 25 mounted in a sealed chamber 26 which is provided with a suction pipe 27 arranged for communication with a sump 28 formed in the base of the machine subjacent the pan 16. The pump is further coupled with a delivery line 29 arranged for fluid communication with a cored chamber 30 partially surrounding one side of the tool housing 12. The upper portion of the chamber 30 is connected through pipe fittings 31 to a pocket 32 formed in the chamber A in the beam 17. The chamber B is formed with a similar pocket 33 which is connected through pipe fittings 34 to a cored chamber 35 on the opposite side of the tool housing 12. A pipe 36 connects the chamber with the conduit 37 which carries the compound discharged from the chamber 35 to a riser provided with a flexible nozzle 38 that may be adjusted to direct the cutting compound over the cutting tools, work and the face of the spindle housing and contiguous parts of the machine.

From the foregoing it will be seen that the temperature of the cutting compound will be raised appreciably as it flows over the cutting tools and work pieces but as it is drained from the chip pan 16 and circulated by the pump through the cored passage 30, the chambers A and B and the cored passage 35 the heat thereof will be dissipated through such parts with a result that the expansion of such members will be maintained substantially equal to that of the spindle assembly adjacent the portion of the machine over which the cooled cutting compound is delivered.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

We claim:

1. In a screw machine, a housing, a work holding spindle therein, a second housing, a tool slide therein disposed in parallel relation with said spindle, a beam uniting said housings and guiding said tool slide, the tool slide housing and beam having passageways therein arranged in fluid communication with each other, a reservoir in the base of said machine, a conduit intermediate said reservoir and the tool slide housing, and a pump connected to said conduit for circulating a fluid through said passageways, whereby the housing and beam are maintained at a uniform temperature.

2. In a screw machine, a work holding spindle, a housing therefor, a reciprocatory tool slide, a housing therefor remote from the spindle housing, a beam uniting said housings and guiding said tool slide, said beam and tool slide housing having passageways therein arranged in fluid communication with each other, a conduit leading from the passageway in the tool slide housing to a point adjacent the spindle, means for circulating a fluid through said passageways and over said spindle, means for the recovery of the fluid and means to facilitate the recirculation of the fluid.

3. In a machine tool embodying a work holding spindle and a reciprocable tool slide disposed in parallel relation, means for maintaining the alignment thereof comprising, a housing for said spindle, a housing for said tool slide, a beam uniting said housings and guiding said tool slide, the tool slide housing and beam having intercommunicating passageways therein, a pump for circulating a fluid through said passageways, a sump for the reception of the fluid and a conduit intermediate said pump and said sump for the recirculation of the fluid.

4. In a screw machine, a work holding spindle, a housing therefor, a tool slide, a housing therefor having a pair of passageways therein, a beam uniting said housings and having a pair of passageways therein communicating respectively with the passageways in said tool slide housing, means on said beam for guiding said tool slide, a pump connected to one of the passageways in said tool slide housing for circulating a fluid therethrough, a conduit from the other passageway in said housing to a point adjacent said work holding spindle, and a reservoir in the base of the machine in fluid communication with said pump.

ALFRED F. JELINEK.
WALTER E. GROSS.